May 14, 1968   L. D. GILL   3,383,344
SUBSTANTIALLY ANHYDROUS CERAMIC GLAZES IN PROPELLANT-TYPE CANS
Filed Sept. 16, 1964
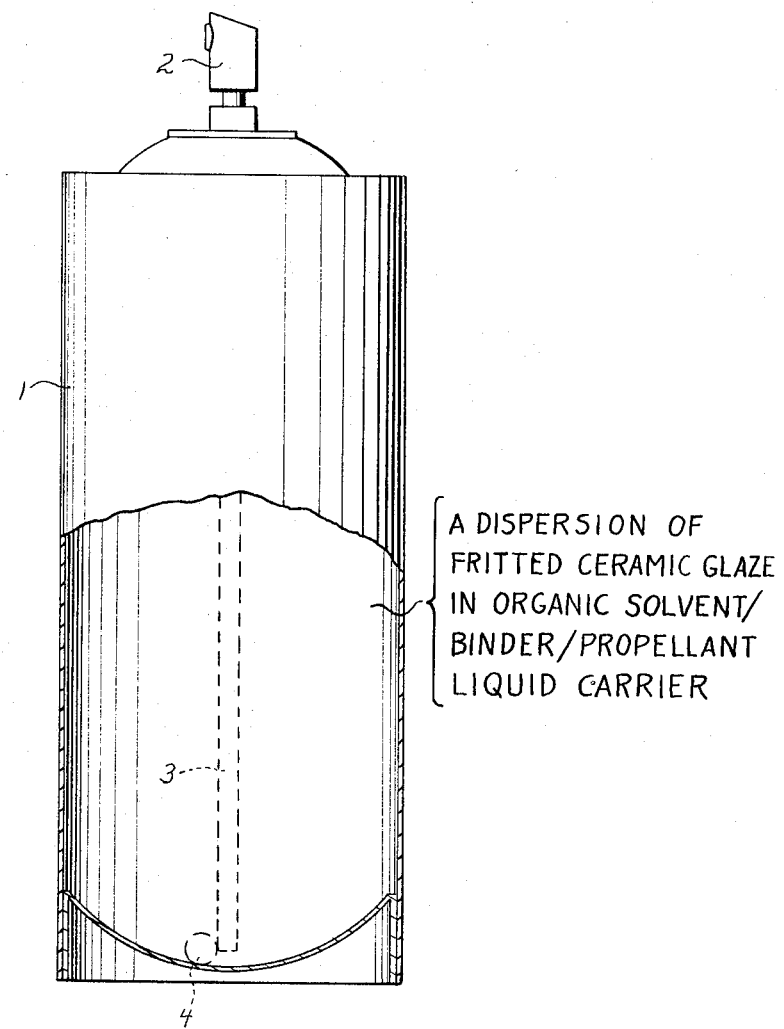
LAURENCE D. GILL
    INVENTOR.
BY G. G. Christensen
ATT'Y.

United States Patent Office 3,383,344
Patented May 14, 1968

3,383,344
SUBSTANTIALLY ANHYDROUS CERAMIC
GLAZES IN PROPELLANT-TYPE CANS
Laurence David Gill, Baltimore, Md., assignor, by mesne
assignments, to SCM Corporation, New York, N.Y., a
corporation of New York
Filed Sept. 16, 1964, Ser. No. 396,871
7 Claims. (Cl. 260—22)

ABSTRACT OF THE DISCLOSURE

A stable combination comprising a novel, substantially anhydrous, sprayable, ceramic glaze composition, canned in a push-button-type spray having a nozzle has been discovered and is described.

The sprayable ceramic compostion comprises (A) an eductible frit composition, (B) a volatile organic solvent component, (C) an organic binder component, and (D) a normally gaseous chlorofluoro alkane having 1–2 carbon atoms. The ceramic glaze composition is novel in that it contains a normally gaseous chlorofluoro alkane. The claimed combination of the novel ceramic glaze composition in a push-button-type can provides a propellable stable practical glaze composition in which the glaze components are self-propelled in the proper proportions to provide uniformity in the glazes when fired.

---

This invention relates to push-button-type spray can dispenser assemblies filled with a ceramic glaze composition and from which the glaze components can be propelled for convenient application to articles on which the glaze is to be subsequently fired.

In the ceramic hobby, school and similar fields where glazed ceramic articles are desirably made without elaborate equipment, it has long been recognized that great convenience would result if ceramic glazes could be packaged in push-button-type propellant cans such as are used for paints, hair-sprays, disinfectants, etc. I am aware that a number of individuals and commercial concerns have, for a number of years, sought to prepare and sell such canned glazes but have been unsuccessful for a variety of reasons, two of the main reasons being that the glaze formulations, when packaged with suitable propellants, had very short usable shelf-life and during this usable shelf-life the glaze components were not propelled from the cans in the proper proportions to give uniformity in the fired glazes.

I have now discovered how to package comminuted glaze compositions in propellant cans so as to secure both a long useful shelf-life and complete uniformity in the applied-and-fired glazes.

Briefly, my invention stems from the following concepts:

(1) The use of inorganic components in fritted form, preferably as a single eductible frit composition for insured compositional uniformity of the inorganic deposit.

(2) The use of an anhydrous liquid organic solvent (as part of the liquid carrier system);

(3) An anhydrous organic binder component to give strength to the dry bisque secured by spray application of the glaze frit, and (4) The use of Freon or similar gaseous or liquid chlorofluoro alkane hydrocarbon having 1–2 carbon atoms and preferably having 1–2 unreplaced hydrogens.

Accordingly, it is an object of my invention to provide a canned and sprayable comminuted ceramic glaze composition in which all of the needed inorganic components of the glaze have been smelted into frit and in which the frit, in comminuted form, constitutes the sole inorganic dispersed phase in said canned composition.

It is a further object to provide a composition such as last described wherein said comminuted frit is dispersed and suspended in an anhydrous, single-phase, liquid, organic carrier-binder, and wherein a part of said carrier-binder consists of at least one liquid chlorofluoro alkane hydrocarbon propellant having 1–2 carbon atoms and preferably 1–2 unreplaced hydrogens.

Still another object is to provide a sprayable glaze composition adapted for canning in push-button-type spray cans, said composition being formulated to apply a glaze coating, which in dry bisque form, has good bisque strength.

These and other related objects will be apparent from the following description of particular embodiments of the invention taken in conjunction with the attached single figure of drawings which illustrates a push-button-type spray can containing a dispersion consisting of a single glaze frit in a homogeneous liquid, anhydrous organic carrier-binder system.

In previous efforts to provide a sprayable glaze composition wherein the inorganic components included comminuted frit, clay, and some water (free or bound with clay), I found that the composition would undergo various detrimental reactions with the dispersing/propellant liquid carrier. These reactions accounted for the short usable shelf-like of the canned compositions. In seeking to solve this problem, I discovered that water must be excluded from the system, and recognized that this and other objectives could best be attained by combining all the inorganic components into a frit composition having uniform eductibility in aerosol form, preferably by fritting together all the inorganic components of a selected glaze formulation. Such fritting into a single frit produces an anhydrous product and, in addition, gives only one inorganic component which needs to be propelled from the can to give the sought-for bisque application of glazed material. However, two or more frits of essentially the same specific gravity and friability (thus ground to the same particle size distribution and shape) can be used for preserving the mass compositional homogeneity of deposition while avoiding deleterious water.

I also found, however, that such a layer of dry bisque had little cohesion and strength, and could easily be brushed off of the surface to which it has been applied. To solve this problem, I incorporated a small amount of anhydrous organic binder of a type which would be homogeneously dissolved in a combination of volatile, normally liquid anhydrous organic solvent and chlorofluoro alkane propellant of the kinds identified hereinabove. This step, however, introduced a further minor problem since I found that certain organic solvents exhibited the ability to leak through the plastics employed in most commercial feed-tube/valve assemblies of push-button spray cans. This problem of leakage on prolonged storage is, of course, absent when all-metal or selected plastic feed-tube/valve assemblies are used in the spray cans, in which case any volatile organic solvent(s) can be used. Such assemblies are more expensive, however, so to keep the costs at a minimum, I prefer to compromise by using the usual commercial plastic feed tube/valve assemblies and to select the organic solvents(s) of the carrier/binder/propellant liquid phase so as to secure a liquid phase which does not leak through the plastics of such assemblies. Mineral sprits (a normally liquid, essentially aliphatic petroleum hydrocarbon liquid having boiling point range between about 295° F. and about 410° F.) is such a solvent, and I have found that it is fully compatible with the chlorofluoro alkane propellants while also giving a liquid system with the latter which (a) gives good solvency characteristics in respect to organic binders and (b) gives a fully satisfactory propellant spray for educing and applying the sought dry bisque layer having good adhesion and strength.

Other useful solvents of this type which have good compatibility, solvency characteristics, and spray characteristics on the one hand, but which do not exhibit particular deleterious attack on conventional thermoplastic or thermosetting feed-tube/valve assemblies include generally the aliphatic hydrocarbons and their mixtures broadly in the naphtha boiling range (about 170° to 450° F.). Where specially solvent resistant feed-tube/valve assemblies such as all metal ones can be used, higher proportions of stronger solvents in this boiling point range can be used, for example, aromatic and naphthenic hydrocarbon solvents, and mixtures of the same with each other and with aliphatic hydrocarbons, ketones such as methyl ethyl ketone, diisobutyl ketone, and methylisobutyl ketone, and ester solvents such as ethyl acetate.

Advantageously, the mixture of frit and volatile solvent component (considered as a 2-component mixture) should have a solids content between about 60% and about 90% by weight, e.g., have at least about 10% of the normally liquid (at room temperature) solvent component for leveling of the aerosol-deposited frit on the substrate, but not substantially more than about 40% of the solvent to preclude a substantial trapping of residual propellant in the cold glaze deposit which can volatilize as the glaze deposit warms, thus causing undesirable bubbles in the deposit.

To assist suspension of the frit in the sprayable composition I have found it advantageous to thicken the sprayable composition with a minute amount of thickening agent conventional for non-aqueous paint systems, about 0.1–5% of such thickener, and preferably about 0.5–3% for efficiency and economy. Suitable thickeners are, for example, hydrogenated polymerized castor oil fatty acids, ultrafine pyrogenic silica, ultrafine colloidal silica, and cellulosic derivatives such as ethyl cellulose. Preferably I use the anhydrous organic thickeners because they readily can be burned out of the glaze composition.

It will be understood that the frit which is selected for canning according to the present invention can, of course, be of a variety of compositions so as to provide applied bisque layers which mature at different temperatures, depending on the user's needs. Thus, certain cans of glaze would be labelled as providing a low temperature clear or colored glaze, others would indicate by label that they are medium-temperature glazes, while still others would be labelled to indicate use as high-temperature glazes. Accordingly, the invention will be understood to include any of the known ceramic glaze compositions, which have been fritted and comminuted for packaging in and eduction from the spray cans, preferably with all of needed inorganic components combined into a single comminuted frit.

The following table indicates the compositions (in weight percent) of a few typical frits which can be used singly as inorganic glazes in practicing the invention, but it should be understood that the invention is not to be construed as being restricted to them alone.

TABLE I

| | Frit Number and Weight Percent | | | | | | |
|---|---|---|---|---|---|---|---|
| | 1 | 2 | 3 | 4 | 5 | 6 | 7 |
| PbO | | | 61.3 | | 11.3 | 28.67 | 26.70 |
| $K_2O$ | | 5.4 | | 4.0 | 2.4 | 1.99 | 1.85 |
| $Na_2O$ | 5.6 | 14.7 | | 1.6 | 4.0 | 1.87 | 1.74 |
| CaO | | 0.5 | | 14.9 | 5.9 | 5.70 | 5.30 |
| MgO | | | | 0.6 | | | |
| BaO | 27.4 | | | 4.1 | | | |
| ZnO | | 0.7 | | 13.4 | 9.5 | | |
| $Al_2O_3$ | 5.4 | 12.1 | 7.2 | 8.2 | 7.4 | 3.76 | 6.73 |
| $B_2O_3$ | 12.4 | 16.9 | | 4.5 | 6.5 | 13.25 | 12.34 |
| $SiO_2$ | 49.2 | 49.7 | 31.5 | 49.3 | 53.0 | 41.20 | 42.01 |
| F | | 1.8 | | | | 2.35 | 2.19 |
| $ZrO_2$ | | | | | | 1.21 | 1.12 |

It will be understood that if colored glazes are wanted, then any compatible ceramic stain composition can be added to the glaze formulations prior to fritting. The amount of stain(s) can vary widely, as will be understood, since the amount is simply that which gives the desired color. Typical amounts are from about 0.5% to 20% or more, by weight, based on the weight of the clear inorganic glaze composition to which the stain is added.

For imparting adhesion and strength to the applied dry bisque, any anhydrous organic binder can be used, provided it is soluble in the organic, mixed solvent/chlorofluoro alkane liquid phase. The amount of binder can vary considerably, but since it must be burned out during firing and therein tends to leave some residue, I prefer to use as little as will give the desired properties to the bisque, e.g., 0.5%–10% by weight. I also prefer to use organic binder(s) which leave little residue (carbon plush ash) when tested by a suitable burn-out procedure. The Conradson Carbon Test is suitable, and organic binders which yield a total residue of less than about 3.5% by this or an equivalent test are suitable for use in the present invention. The Conradson Test is described in ASTM Standard (1946) Part III–A, page 120, and in this and equivalent burn-out tests, an oxidizing atmosphere (simulating that which surrounds glazed articles when they are being fired) is used.

Suitable organic binders for use in the invention (i.e., having a low total residue value, and being homogeneously soluble in the described organic solvent/propellant liquid phase) can be any normally solid monomer, polymer, copolymer, multi-polymer or natural resin, or any initially liquid or plastic mass which is convertible to a solid, or near-solid state, e.g., glyceride drying oils, waxes, varnishes, paraffin waxes, thermoplastic resins, thermosetting resins or resin/reactant systems, natural resins and gums (e.g., rosin, shellac, gum tragacanth, etc.) synthetic resins (alkyds, modified rosins, Diels-Alder rosin adducts, modified shellac, unsaturated polyester/reactive monomer combinations, urethanes, amine/aldehyde resins, phenol/aldehyde resins, alkylated amine or phenol/aldehyde resins, synthetic rubbers, solvent-soluble adhesives, and the like). The prior art in ceramics, metal powders, ceramic-coated electrical resistors, inorganic-insulated wire arts and many other fields abound with illustrations of the use of organic binders to give adhesion and strength to otherwise powdery masses of inorganic materials or mixtures of inorganic materials, so that detailed description of suitable binders is not here believed to be needed.

As will be understood, the comminuted frit used in a particular canned glaze composition of the invention should, of course, be sufficiently finely-divided to pass readily through the push-button-type valves of spray cans. The fineness of comminution otherwise is no significant factor of the invention; for efficiency and economy I generally use a frit that is ground to finess of more than 99% passing a 325 mesh Tyler screen.

The comminuted frit can be dispersed in the liquid solvent/chlorofluoro alkane/organic binder phase at any desired solids content level permitting eduction of the frit from the spray-can. For desirable sales appeal, however, the solids content (non-volatile matter) should be as high as practical while securing substantially full eduction of the frit from the can. I have found that frit contents of about 20% to 60% by weight basis total canned composition, not only result in full eduction, but can also be made as fairly time-stable dispersions. As is customary in paint, cosmetics and similar spray cans, a small metal pellet or ball can be included in the can to hasten redispersion of the solids by shaking the can.

The chlorofluoro alkanes defined hereinabove and employed in the present invention as propellants are illustrated by the following specific compounds:

| Trade Name | Formula | B.P., °C. | Chemical Name |
|---|---|---|---|
| Freon | $CHClF_2$ | −41 | Chlorodifluoro-methane. |
| Freon 21 | $CHCl_2F$ | 9 | Dichlorofluoro-methane. |
| | $CHF_2-CHF_2$ | −23 | 1 difluoro-2-difluoro-ethane. |
| | $CHCl=CHF$ | 10 | 1 chloro-2-fluoro-ethylene. |
| | $CHClF-CHF_2$ | 17 | 1 chlorofluoro-2-difluoro-ethane. |
| Freon 12 | $CCl_2F_2$ | −29 | Dichlorodifluoro-methane. |
| Freon 11 | $CCl_3F$ | 24 | Trichlorofluoro-methane. |
| Freon 114 | $CClF_2-CClF_2$ | 4 | 1 chlorodifluoro-2-chloro-difluoro-ethane. |
| Freon 115 | $CClF_2-CF_3$ | −38 | 1 chlorodifluoro-2-trifluoro-roethane. |
| Freon 142 | $CH_3-CClF_2$ | −10 | 2 chlorofluoro-ethane. |
| | $CH_3-CHF_2$ | −25 | 2 difluoroethane. |
| | $CH_2=CHF$ | −72 | 2 fluoro-ethylene. |
| | $CHF_2-CF_3$ | −48 | 1 difluoro-2-trifluoro-ethane. |
| Freon 23 | $CHF_3$ | −82 | Trifluoro-methane. |
| Freon 14 | $CF_4$ | −128 | Carbon tetrafluoride. |
| Freon 13 | $CClF_3$ | −81 | Chlorotrifluoro-methane. |
| | $CCl_2=CF_2$ | 19 | 1 dichloro-2-difluoro-methane. |
| | $CClF=CF_2$ | −28 | 1 chlorofluoro-2-di-fluoro-ethylene. |
| | $CF_2=CF_2$ | −78 | Tetrafluoroethylene. |
| | $CH_2=CF_2$ | −70 | 2 difluoro-ethylene. |
| | $CH_2-CClF$ | −25 | 2 chlorofluoro-ethane. |
| | $CH_2Cl-CClF_2$ | 6 | 1 chloro-2-chlorodifluoro-ethane. |

While I prefer to use Freon ($CHClF_2$) because of its ready availability, good time-stability, and its non-flammability, the others which are normally gases and are saturated can be used equally well. The remainder can be used in minor amounts to provide mixtures, thereby to secure variations in solubility characteristics and in wetness or dryness of the spray. Basis combined weight of frit, volatile organic solvent, and organic binder, I use about 40–50% of the halogenated propellent for effective aerosol propulsion.

The following examples illustrate the principles of my invention and include the best modes presently known to me for carrying those principles into practice.

Example I

A sprayable frit glaze composition is prepared from:

| | | |
|---|---|---|
| Fritted glaze 7 (over 99% passing 325 mesh Tyler Standard Sieve) | g | 100 |
| Mineral spirits (B.P. range 295–410° F.) | ml | 30 |
| Alkyd resin varnish solution [1] | ml | 10 |
| Hydrogenated polymerized castor oil fatty acids | g | 1.5 |

[1] A soybean oil/pentarythritol/phthalic anhydride alkyd resin of low Acid Number (4) having the above mineral spirits as solvent, and having solids content (NVM) of about 60% by weight.

The above four components are ball milled until a uniform dispersion is secured. The resulting dispersion is canned in a conventional 12 oz. push-button type aerosol dispensing can having a plastic feed-tube and valve assembly with Freon ($CHClF_2$), using 45.6 weight parts of Freon per 100 weight parts of said dispersion.

In spraying and firing tests, it is found that the composition sprays well, and deposits a dry bisque layer having good strength and adhesion, which layer matures to a clear glaze of good quality. Similar tests of the composition in commercial spray cans using conventional plastic valve assemblies establish that leakage from the cans is insignificant even after many months.

Example II

Equally good results are secured when Frit 7 of Example I is replaced with an equal weight of Frit 6, supra, comminuted to 100% minus 325 mesh.

Example III

A sprayable fritted glaze composition is prepared from:

| | | |
|---|---|---|
| Fritted glaze 6 (over 99% passing 325 mesh Tyler Standard Sieve) | g | 100 |
| Turpentine | ml | 58.5 |
| Oil of Copaiba (Jesuit Balsam) | ml | 1.5 |
| Rosin (powdered) | g | 0.50 |
| Ethyl cellulose (ethoxyl content 47–50%) as thickener | g | 0.15 |

The composition is prepared by ball milling the ingredients together until all of the organic materials form a homogeneous liquid phase having the fritted glaze uniformly suspended and dispersed therein.

The resulting sprayable composition is canned in a push-button-type can having a conventional all-metal valve assembly with Freon ($CHClF_2$) about 46 weight parts of Freon per 100 weight parts of said composition. Spraying tests of the canned composition establish that the fritted glaze is sprayed well from the can and yields a good matured glaze after being fired. The use of an all-metal valve here overcomes the leakage problem encountered with the plastic valves of usual commercial spray cans. In storage tests, some settling of the frit is found, but the usual shaking of the can (with its included pellet) brings about satisfactory redispersion.

Having described my invention, what I claim is:

1. A stable, substantially anhydrous sprayable ceramic glaze composition canned in a push-button-type spray can, said composition consisting essentially of:

(A) a single eductable comminuted frit which, when fired by itself, produces a ceramic glaze;

(B) about 30 milliliters of mineral sprits per 100 grams of said comminuted frit;

(C) about 10 milliliters per 100 grams of comminuted frit of a mineral spirits solution of a drying-oil-modified phthalic anhydride/pentaerythritol alkyd resin of low acid number, said solution having a solids content of about 60% by weight; and (D) about 40–50% by weight, based on the total weight of $A+B+C$, of a normally gaseous chlorofluoro alkane having 1–2 carbons.

2. A composition as claimed in claim 1 wherein said chlorofluoro alkane has 1–2 hydrogens unreplaced.

3. A composition as claimed in claim 2 wherein said chlorofluoro alkane is dichlorofluoro-methane.

4. A stable, substantially anhydrous sprayable ceramic glaze composition canned in a push-button-type spray can having a nozzle, said composition consisting essentially of:

(A) comminuted frit eductible from said nozzle in homogeneous mass composition, said frit capable of producing a ceramic glaze when fired by itself;

(B) a volatile organic solvent component selected from the group consisting of aliphatic, aromatic and naphthenic hydrocarbons, ketones, esters and mixtures thereof serving as dispersing carrier, said component being sufficient in amount to provide a frit/solvent component dispersion having a solids content between about 60 and 90%, by weight;

(C) an organic binder component selected from the group consisting of natural and synthetic polymers, copolymers, multipolymers and mixtures thereof, being soluble in said dispersion and serving to give strength and adhesion to said frit when the latter is in the form of a dry bisque; and (D) about 40–50% by weight based on the total weight of $A+B+C$, of a normally gaseous chlorofluoro alkane having 1–2 carbons.

5. A composition as claimed in claim 4 wherein said chlorofluoro alkane has 1–2 hydrogens unreplaced.

6. A composition as claimed in claim 5 wherein said chlorofluoro alkane is dichlorofluoro-methane.

7. A composition as claimed in claim 4 having a single frit.

References Cited

UNITED STATES PATENTS

| | | | |
|---|---|---|---|
| 2,058,209 | 10/1936 | Bley | 106—48 |
| 2,090,617 | 8/1937 | Bley | 106—48 |
| 2,316,745 | 4/1943 | Robertson et al. | 106—48 |
| 2,379,507 | 7/1945 | Deyrup | 106—48 |
| 2,608,539 | 8/1952 | Bain et al. | 260—22 |
| 2,617,780 | 11/1952 | Lutz | 117—104 |
| 2,766,157 | 10/1956 | Peterson | 117—104 |
| 2,803,906 | 8/1957 | Steinhilber | 117—104 |
| 3,096,001 | 7/1963 | Boe et al. | 117—104 |

DONALD E. CZAJA, *Primary Examiner.*

R. W. GRIFFIN, *Assistant Examiner.*